United States Patent [19]

Claussen et al.

[11] Patent Number: 4,855,259

[45] Date of Patent: Aug. 8, 1989

[54] PROCESS OF MAKING CERAMIC MOLDINGS CONTAINING CORDIERITE

[75] Inventors: Nils Claussen, Leonberg; Gunter Petzow, Leinfelden-Echterdingen; Katharina Nieszery, Stuttgart; Wolfgang Panhorst, Mainz; Karl-Ludwig Weisskopf, Stuttgart, all of Fed. Rep. of Germany

[73] Assignee: Firma Schott Glaswerke, Hattenbergstrasse, Fed. Rep. of Germany

[21] Appl. No.: 775,642

[22] Filed: Sep. 13, 1985

[30] Foreign Application Priority Data

Sep. 14, 1984 [DE] Fed. Rep. of Germany ....... 3445765
Sep. 17, 1984 [DE] Fed. Rep. of Germany ....... 3434077

[51] Int. Cl.$^4$ ............................................. C03C 10/08
[52] U.S. Cl. ......................................... 501/9; 501/87; 501/89; 501/95; 501/98; 501/105; 501/107; 501/118; 501/119; 264/65; 264/311
[58] Field of Search ...................... 501/95, 118, 98, 9; 264/60, 61, 65, 311, 82

[56] References Cited

U.S. PATENT DOCUMENTS

| | | | |
|---|---|---|---|
| 3,849,145 | 11/1974 | Pitha | 501/9 |
| 4,110,260 | 8/1978 | Yamamoto et al. | 501/154 |
| 4,428,763 | 1/1984 | Layden | 501/95 |
| 4,464,192 | 8/1984 | Layden et al. | 501/95 |
| 4,464,475 | 8/1984 | Beall et al. | 501/9 |
| 4,495,300 | 1/1985 | Sano | 501/104 X |
| 4,540,621 | 9/1985 | Eggerding | 501/118 |
| 4,542,109 | 9/1985 | Pasto | 501/98 |
| 4,543,345 | 9/1985 | Wei | 501/89 X |
| 4,576,919 | 3/1986 | Hodge | 501/9 |

Primary Examiner—William R. Dixon, Jr.
Assistant Examiner—Karl Group
Attorney, Agent, or Firm—Felfe & Lynch

[57] ABSTRACT

Ceramic moldings containing finely crystalline cordierite are described, which are obtainable by the intensive grinding of precrystallized cordierite powder, mixing the powder with second additive phases of higher modulus of elasticity, shaping the mixture, and sintering the greenware thus obtained in a siliceous atmosphere at temperatures between 900° and 1400° C. The moldings according to the invention have not only good mechanical strengths but also outstanding dielectric and thermal properties; they are therefore especially suitable for use as dielectrics and as thermal insulating components.

12 Claims, 1 Drawing Sheet

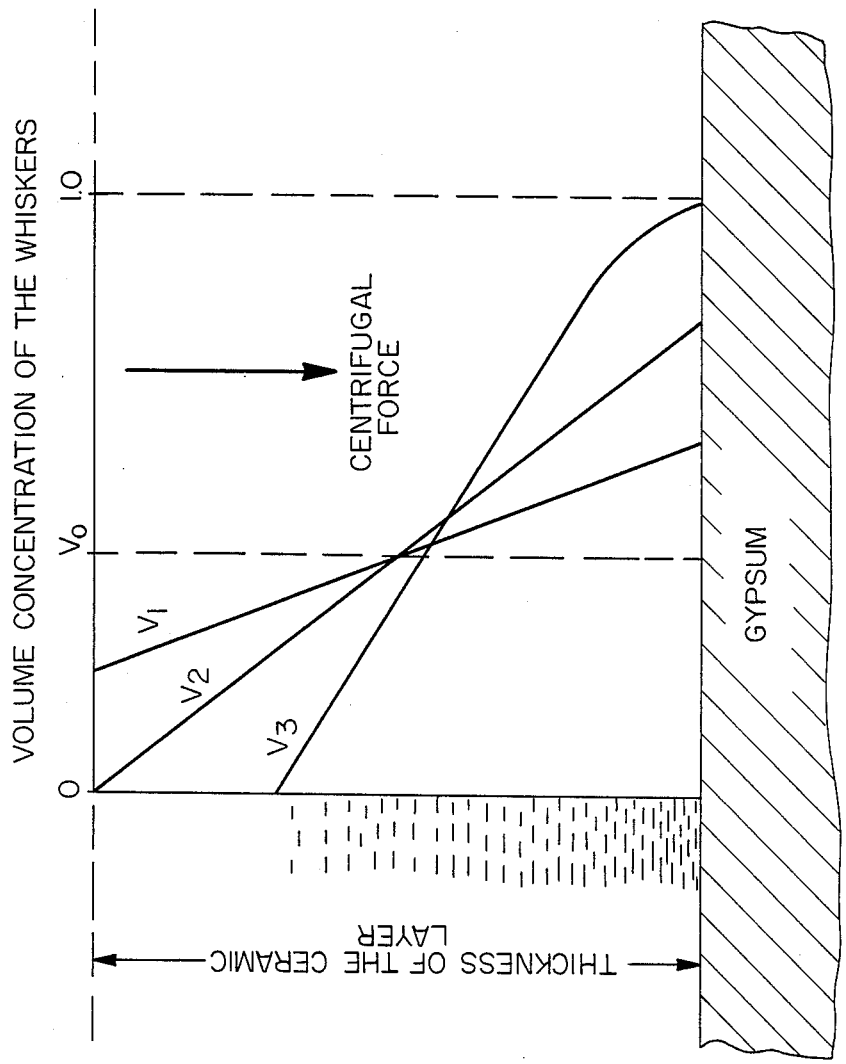

PROCESS OF MAKING CERAMIC MOLDINGS CONTAINING CORDIERITE

BACKGROUND OF THE INVENTION

The invention relates to ceramic moldings containing finely crystalline cordierite, a method for their production, and their use.

Cordierite ($2Al_2O_3.2MgO.5 SiO_2$) is commonly made by devitrifying a glass composition of the appropriate nominal formulation, or by sintering vitreous powders (with simultaneous devitrification) or precrystallized (ceramicized) powders. The strength and viscosity (approximately <150 MPa and <1.5 MPa$\sqrt{m}$) and the modulus of elasticity (<100 GPa) of such materials is of course low. However, on account of the low thermal coefficient of expansion ($<1.10^{-6}$/K), the low dielectric constant and low conductivity, bodies molded from cordierite would be very suitable as dielectrics, e.g., for integrated-circuit substrates, and as heat blocking components, e.g., for use in the thermally stressed areas of heat engines, such as conventional piston engines, for example.

It is therefore the object of the present invention to offer cordierite moldings which, in addition to good dielectric and heat blocking properties, will also have good mechanical properties. This object is achieved by ceramic moldings according to the invention.

THE INVENTION

The subject matter of the invention is ceramic moldings containing finely crystalline cordierite, which can be obtained by the intensive grinding of precrystallized cordierite powder, mixing the powder with second additive phases of higher modulus of elasticity, shaping the mixture, and sintering the greenware thus prepared in a siliceous environment at temperatures between 900° and 1400° C. Preferably the sintering temperatures are less than 1280° C., and especially between 1000° and 1250° C.

The ceramic moldings according to the invention consist preferably of more than 50% by volume of finely crystalline cordierite. The modulus of elasticity of the additive phases consist advantageously of silicon nitride and/or silicon carbide and/or zirconium oxide and/or aluminum oxide and/or magnesium oxide and/or mullite ($3 Al_2O_3.2 SiO_2$) and/or zircon (zirconium silicate) and/or boron carbide, and they are especially in the form of powders and/or whiskers; the additive-phase content of the ceramic moldings according to the invention is best between 1 and 50%, and especially between 5 and 30% by weight. For example, 5 to 30 wt.-% of silicon nitride, 5 to 25 wt.-% of zirconium oxide and 1 to 5 wt.-% of gamma-aluminum oxide have proven especially advantageous as second additive phases. In another desirable embodiment of the invention, 1 to 5, especially 5 wt.-% of silicon nitride powder, 5 to 10 wt.-% of zirconium oxide power, and 5 to 40 wt.-% of silicon nitride whiskers or 5 to 40 wt.-% of silicon carbide whiskers are added.

Also subject matter of the invention is a method of preparing the ceramic moldings according to the invention, which method is characterized by intensively grinding precrystallized cordierite powder, mixing the powders thus obtained with second additive phases of higher modulus of elasticity, shaping the mixture, and sintering the greenware between 900° and 1400° C. in an environment containing silicon.

Preferably the sintering temperature is below 1280° C., and is especially between 1000° and 1250° C.

An additional desirable development of the invention involves a ceramic molding according to the invention, reinforced by short fibers (whiskers), as well as a method for their production.

The siliceous sintering environment is best produced by a bed of powder containing silicon, in which the compacts are then sintered; a siliceous powder bed is especially one which contains the silicon nitride or silicon oxide powder and/or whiskers, e.g., ground quartz. In another desirable development of the method according to the invention, the siliceous sintering environment can be produced by the addition of silicon nitride and/or silicon dioxide in the form of powder or whiskers, especially in the amount of 1 to by weight, to the cordierite powder, in which case the compacts can be sintered, for example, in air, nitrogen and/or argon, or in some other suitable atmosphere.

The mixing, for example the admixing of the silicon nitride powder or whiskers, can be performed in an ordinary mixing apparatus suitable for the purpose, such as an attrition mill using aluminum oxide grinding media, for example.

By lowering the sintering temperature, especially below 1280° C., in a siliceous environment with simultaneous dispersion of two phases of high modulus of elasticity, the particle size can be kept small (< 2 to 5 microns). In this manner a considerable gain in strength is achieved (up to 400 MPa flexural strength with $K_{IC}$ values of better than 2.5 MPa$\sqrt{m}$). If cordierite compacts containing zirconium oxide are sintered together with SiAlON compacts in a powder bed containing silicon nitride (enclosed in an aluminum oxide crucible) in air at different temperatures, these good mechanical properties are obtained; on the other hand, similar cordierite compacts containing zirconium oxide, which formerly were sintered only in air, have shown lower density and strength characteristics for the same sintering temperature and time. The ultimate flexural strength of the moldings according to the invention is also higher.

The fact that the addition of silicon nitride powder to oxide powders improves the sintering must be considered to be most surprising, because it contradicts all previous experience. Commonly, all covalently bound ceramics are considered to be additives which sinter poorly or interfere with sintering. All the more surprising was the contrary finding: cordierite compacts containing additional additives (always together with at least 5 wt.-% of silicon nitride) such as aluminum oxide, zircon, mullite, silicon carbide, and boron carbide, in powder form as well as in the form of fine silicon nitride and silicon carbide whiskers, were able to be sintered, especially in the silicon nitride powder bed, at relatively low temperatures, especially below 1280° C. up to more than 95% of the theoretical density. The reason for the high strengths is considered to be, on the one hand, the fine particle size (often less than 1 micron) of the cordierite and of the dispersed second phase, as well as the increase in the total modulus of elasticity resulting from the additives (silicon nitride, silicon carbide, aluminum oxide, zirconium oxide, mullite, zircon and boron carbide). The thermal expansion coefficient of the cordierite-base ceramics according to the invention is slightly higher than that of pure cordierite ($3-6.10$/K), but this is compensated by the higher resistance to thermal shock.

The incorporation of short fibers (whiskers) of small diameter (approx. 0.01 to 10 microns) for the reinforcement of ceramic moldings represents a problem which has not yet been satisfactorily solved. This is especially due to the fact that, in conventional powder-metallurgical processes, an irregular distribution of the fibers (whisker clustering) and a random orientation of the whiskers occur. In addition, due to the relatively low green densities of the ceramic matrix powder while it is being processed (sintered, for example), high matrix tensions and a high residual porosity are produced, which have an undesirable effect. For these reasons it has heretofore been preferred, in the production of fiber-reinforced ceramics, to draw continuous fibers through a powder slip, wind them up, dry them, and then hot-press them. This and other such processes, however, have the disadvantage that the form of the ceramic molding must be very simple (e.g., must be only a preform). The fibers used furthermore have a larger diameter than whiskers (d $\geq$ 5 microns, $d_y$ often less than 1 micron), a lower modulus of elasticity, and much lower strengths; thus, for example, silicon carbide fibers (diameter 10 microns) have a strength of 2000 MPa, but SiC whiskers with a diameter of 0.4 microns have a strength of 20,000 MPa.

A desirable development of the present invention involves ceramic moldings reinforced with whiskers, in which the above-described disadvantages and difficulties can be avoided, and it also involves a method for their preparation The particles of the ceramic matrix powder and/or the whiskers used in the method of the invention have preferably a diameter smaller than 1 micron; according to the invention it is preferable to operate with g values (g = acceleration due to gravity) of 10 to $10^4$, i.e., with 10 to $10^4$ times the acceleration due to gravity, and especially with g = $10$-$10^3$. The volumetric ratio of whiskers to matrix is especially between 0.05 and 0.5; advantageously silicon carbide, silicon nitride and/or aluminum oxide whiskers are used, especially those having average diameters of less than 1 micron and length-to-diameter ratios greater than 10.

In the method of the invention, the matrix powder and fine whiskers are used to prepare, in a known and appropriate manner, e.g., by tumble mixing with plastic balls, a slip suitable for slip casting, in which the whiskers as a rule have the same or a slightly higher settling rate than the matrix powder.

FIG. 1 shows diagrammatically the concentration profile of whiskers in a slip casting on a gypsum plate. As the figure shows, with increasing difference in the settling rate, increasingly steeper concentration profiles ($v_1$, $v_2$, $v_3$) result; in the case of concentration profile $v_0$ = constant, the settling of the powder and of the whiskers in the slip is constant. However, since in most cases the tension-stressed zone of construction components is on the surface, an increasing whisker concentration toward the surface (i.e., toward the gypsum side in the figure) is advantageous. Orientation of the whiskers perpendicular to the surface (tension zone), however, is mechanically undesirable and should be replaced with an orientation of the whiskers parallel with the direction of tension. Now, according to the invention, an increase of the acceleration (g=1: acceleration due to gravity) will bring about an alignment of the whiskers parallel to the direction of tension. In a laboratory centrifuge with a radius of 10 cm, at a rotatory speed of 10,000 rpm, for example, an acceleration of approximately 10,000 g is achieved. The increased acceleration probably brings it about that friction forces between the whiskers are less effective as they sink and pile up on the ground surface, and therefore a parallel orientation is better assured. The centrifugal force (i.e., the rotatory speed) should preferably be adjusted such that the separation of the matrix powder particles according to size will remain within desirable limits, i.e., the narrower the particle size range of the matrix powder is, the higher will be the g values that can be applied.

Experiments with mixtures of whiskers, e.g., with silicon carbide or silicon nitride whiskers, have shown that, at high g values, e.g., g = $10^4$, whisker aggregations, coarse whiskers, and fragments of whisker material or also of grinding tool, which are present as impurities in the slip, are very quickly (within one to several minutes) completely gathered on the ground surface such as the gypsum plate in FIG. 1. By decanting the remaining slip, it is possible in this manner to achieve a "cleansing" to aid in the further processing, i.e., to achieve the removal of undesired impurities and clusters that can diminish the strength of the ceramic molding.

By then slip-casting the slip cleansed in this manner, at g $\geq$ 1, viz. g = 10 to 100, a virtually perfect bidimensional orientation of all whiskers can be achieved. It may therefore be desirable, especially for the achievement of a very complete bidimensional orientation of the whiskers, to subject the slip to a treatment with high g values, such as g = $10^4$, for example, and separate it from the bottoms prior to the molding operation.

For an effective whisker strengthening of ceramic materials, it is especially desirable to work with matrix-/whisker combinations in which the coefficient of thermal expansions of the matrix and whiskers are matched, i.e., differ as little as possible, and/or in which the whiskers have a high strength and/or high moduli of elasticity in comparison to the matrix material, especially in comparison to the cordierite matrix material.

By this desirable development of the invention it is therefore possible to avoid the disadvantages involved in the former methods for the preparation of ceramic moldings reinforced with short fibers (especially irregular distribution and random orientation of the whiskers, high matrix tensions and high residual porosity of the matrix due to low green densities). The important advantages of the invention over the formerly known methods for the incorporation of whiskers (or short fibers, i.e., those with a fiber length-to-diameter ratio greater than 10) into ceramic materials are particularly as follows: bidimensional (flat) orientation of the whiskers, controllable whisker concentration (volumetric ratio) within the molding (such as for example a higher concentration in the tension-stressed area of the compound molding) and high green density of the matrix powder between the whiskers.

On the basis of the good mechanical properties combined with the outstanding electrical and thermal properties, the ceramic moldings according to the invention are therefore very well suited for use as dielectrics, e.g., as substrates for electrical integrated circuits, and/or as heat blocking components, especially in heat engines. Subject matter of the invention is therefore also the use of the ceramic moldings according to the invention as dielectrics, especially as substrates for electrical integrated circuits, and/or as heat blocking components, especially in heat engines, such as, for example, conventional piston engines.

On the basis of the procedures and properties of the short-fiber-reinforced moldings obtained by the desirable further development described herein, these moldings are suitable especially also as rotationally symmetrical composite moldings and engine ceramics, for example for turbine rotors, turbine stators, cylinders, disks, etc.

The following examples will further explain the invention without restricting it. Unless otherwise stated, the temperatures are in degrees Celsius and the percentages are percentages by weight.

EXAMPLES

Example 1

100 grams of ceramicized cordierite powder containing 15% zirconium oxide was ground with 1, 15, 25 and 35% of silicon nitride powder in water for 6 hours in an attritor using 85% aluminum oxide grinding balls, and dried and pressed cold under isostatic pressure at 630 MPa. The compacts were then sintered for 2 hours in air, at temperatures between 950° C. and 1340° C. in a silicon nitride powder bed. Samples containing 25% of silicon nitride, which had been sintered at 1280° C., had a maximum flexural strength (4-point, 28/9 mm) of 380 MPa. The Vickers indentation $K_{IC}$ (ICL) amounted to approximately 3 MPa$\sqrt{m}$. The average cordierite grain size and silicon nitride particle size was around one micron.

Example 2

100 grams of cordierite powder were treated as in example 1 with 15% of silicon carbide, 15% of gamma-aluminum oxide, and 15% of mullite, and sintered for 2 hours at 1250° C. The flexural strength in all samples was between 220 and 310 MPa as compared with 150 MPa in the case of pure cordierite that had been only ground and sintered in air (not in the silicon nitride powder bed).

Example 3

100 grams of cordierite powder containing 5% of silicon nitride, were ground in one case with 5% of gamma-aluminum oxide, in another with 5% of zirconium oxide, and in another with 25% of silicon carbide in an attrition mill as in Example 1 and compacted. The compacts were then sintered in air only (not in the silicon nitride powder bed) for 2 hours at 1280° C. The densities in all cases were better than 95% of the theoretical density, and the strength, exception the case of the sample containing silicon carbide, was 270 MPa.

Example 4 100 grams of cordierite powder and 5% of silicon nitride powder were ground in an attrition mill as in Example 1. Then 30% of silicon nitride whiskers (diameter approximately 0.3 microns) were added to the slip thus produced and shaken in a drum mixer for 25 hours together with plastic balls (2 to 4 mm diameter). This slip, which also contained 1% of a steric dispersing agent (Balapix), was then poured onto a gypsum surface and dried. After 2 hours of sintering the approximately 1 millimeter thick plate at 1280° C., as described in Example 1, the maximum flexural strength was 390 MPa, the density 92% TD.

Example 5

100 grams of a mixture of 50% cordierite (=64% by volume), 30% of zirconium oxide containing 3 mol-% of yttrium oxide (=16% by volume) (3Y-TZP) and 20% of silicon nitride whiskers (=20% by volume) (SNW 1, Tateho Chem) were mixed for 25 hours in propanol in a drum mixer containing plastic balls. The ratios of admixture bring about the result that the cordierite-zirconia matrix has the same average thermal expansion coefficient as the silicon nitride whiskers ($\alpha = 2.5 \times 10^{-6}/K$). (The cordierite and Y-TZP were first ground in an attrition mill for 6 hours.) The slip was then pressure cast onto a gypsum support in a centrifuge at 10,000 rpm. The dried plates were then sintered at temperatures between 950° C. and 1340° C. in a silicon nitride powder bed, for two hours. The flexural strength was 450 MPa when the samples are tested such that the side on which tensile stress was applied was identical with the side facing the gypsum plate. Metallographic studies showed that the silicon nitride whiskers had a concentration increasing toward the gypsum plate (due to faster settling) as well as a bidimensional orientation, i.e., an orientation parallel to the direction of the tension (cf. FIG. 1).

Example 6

100 grams of a composition of 45% by volume of cordierite, 35% by volume of unstabilized zirconium oxide and 20% by volume of silicon carbide whiskers (SCW 1, Tateho Chem. diameter 0.05–0.2 microns) were mixed as follows: first cordierite was ground with zirconium oxide for 6 hours in propanol in an attrition mill; then the silicon carbide whiskers were added to the slip and mixed for 24 hours with plastic balls. The slip was dried in a Rotovap dryer (manufactured by Buechi). Samples were pressed from it isostatically at 630 MPa and sintered for 2 hours as in Example 1, at 1400° C. The flexural strength at room temperature was 380 MPa; in the case of samples which were then isostatically compacted hot at 1350° C. for 10 minutes, the flexural strength increased to 520 MPa. Also at 1000° C. the strength was still 350 MPa.

Example 7

The slip prepared as in Example 6 was treated with 1% of a dispersing agent (Dolapix) and slip-cast under high centrifugal force as in Example 5. After sintering as in Example 1, followed by metallographic examination, again a bidimensional (sheet-like) orientation of the whiskers appeared, while the concentration of the whiskers increased considerably toward the surface (which lay against the gypsum surface during the slip casting).

We claim:

1. A method for the preparation of a ceramic molding comprising the steps of:
    intensively grinding crystallized cordierite powder to form a matrix powder;
    mixing said matrix powder with 1–50 wt % of a second additive phase selected from the group consisting of silicon nitride, silicon carbide, zirconium oxide, aluminum oxide, magnesium oxide, mullite, zircon, boron carbide and mixtures thereof;
    shaping the mixture to form a greenware compact; and
    sintering said greenware compact at a temperature between 900° and 1400° in an atmosphere containing silicon, said atmosphere produced by a siliceous powder bed.

2. The method of claim 1 in which the siliceous powder bed contains silicon nitride.

3. The method of claim 1 wherein
the shaping step comprises casting a fine, homogeneous slip formed of the matrix powder of cordierite, the second additive phase and whiskers, in a mold; and with an acceleration g=1 to form the greenware compact and then drying the compact, and
after the sintering step, the ceramic molding is subjected to the additional step of compacting isostatically with heat.

4. The method of claim 3 wherein the particles of the ceramic matrix powder and the whiskers have a diameter of less than 1 micron.

5. The method of claim 1 wherein, g is 10 to $10^4$.

6. The method of claim 3 wherein the whisker/matrix volumetric ratio is between 0.05 and 0.5.

7. The method of claim 3 wherein silicon carbide, silicon nitride, or aluminum oxide whiskers or a mixture thereof with average diameters less than 1 micron and length: diameter ratios greater than 10 are used as whiskers.

8. The method of claim 3 wherein matrix/whisker combinations are used, in which the thermal expansion coefficients of matrix and whisker are matched, and in which the whiskers have high strengths and/or high moduli of elasticity in comparison to the matrix material.

9. The method of claim 1 wherein the mixture of matrix powder and second additive phase contains 5 to 30 wt. % of silicon nitride, 5 to 25 wt. % of zirconium oxide and 1 to 5 wt. % of gamma aluminum oxide.

10. The method of claim 1 wherein the mixture of matrix powder and second additive phase contains 1 to 5 wt. % of silicon nitride powder, 5 to 10 wt. % of zirconium oxide powder, and 5 to 40 wt. % of silicon nitride whiskers or silicon carbide whiskers.

11. A method for the preparation of a ceramic molding comprising the steps of:
intensively grinding crystallized cordierite powder to form a matrix powder;
mixing said matrix powder with 1–59 wt. % of a second additive phase selected from the group consisting of silicon nitride, silicon carbide, zirconium oxide, aluminum oxide, magnesium oxide, mullite, zircon, boron carbide and mixtures thereof;
shaping the mixture to form a greenware compact; and
sintering said greenware compact at a temperature between 900° and 1400° in an atmosphere containing silicon, said atmosphere produced by addition of at least 1 wt. % of silicon nitride to the cordierite powder.

12. A method for the preparation of a ceramic molding comprising the steps of:
intensively grinding crystallized cordierite powder to form a matrix powder;
mixing said matrix powder with 1–50 wt. % of a second additive phase selected from the group consisting of silicon nitride, silicon carbide, zirconium oxide, aluminum oxide, magnesium oxide, mullite, zircon, boron carbide and mixtures thereof;
shaping the mixture to form a greenware compact; and
sintering said greenware compact at a temperature between 900° and 1400° in an atmosphere containing silicon, said atmosphere produced by addition of at least 1 wt. % of silicon dioxide to the cordierite powder.

* * * * *

UNITED STATES PATENT AND TRADEMARK OFFICE
CERTIFICATE OF CORRECTION

PATENT NO. : 4,855,259

DATED : August 8, 1989

INVENTOR(S) : Nils Claussen, et al.

It is certified that error appears in the above-identified patent and that said Letters Patent is hereby corrected as shown below:

On the title page:

Filing date of
Priority Document
No. P 34 45 765.8
reads as:

"September 24, 1984" should be --December 14, 1984--.

Col. 2, line 18 change "1 to by" to-- 1 to 10% by --.

Col. 7, claim 3 line 5 change "g=1" to -- g≥1 --.

Col. 8, claim 11 line 7 change "1 to 59" to --1 to 50 --.

Signed and Sealed this

Fourteenth Day of January, 1992

Attest:

HARRY F. MANBECK, JR.

*Attesting Officer*     *Commissioner of Patents and Trademarks*